April 21, 1936.  J. L. OSBORNE  2,038,124

APPARATUS FOR FORMING PRESSED KEYS

Filed May 4, 1932.

INVENTOR
J. L. Osborne,
BY Neil D. Preston,
his ATTORNEY

UNITED STATES PATENT OFFICE 2,038,124

APPARATUS FOR FORMING PRESSED KEYS

John L. Osborne, Rochester, N. Y., assignor to General Railway Signal Company, Rochester, N. Y.

Application May 4, 1932, Serial No. 609,147

4 Claims. (Cl. 78—60)

The present invention relates in general to a connecting means for interconnecting members, and has more particularly reference to an apparatus, and a method, for connecting together two parts of a ball race for bearings and the like.

While parts can be interconnected by welding, such as spot-welding, and also, instead of making the member of two parts, it can be made of a single piece of material and subjected to such machining as to bring it to the desired finished form, these ways of reaching the desired end are relatively expensive.

With the above and other considerations in mind, it is proposed, in accordance with this invention, to provide a connecting means which can be thoroughly depended upon to hold the connected members together, and which is most economical to produce or practice.

More specifically, it is proposed to connect two interfitting members together, by means of a key, with the key to be formed in place, by pressing a relatively soft, but solid, metal, into a key-way of the proper configuration formed in the members to be interconnected.

Further objects, purposes and characteristic features will appear as the description progresses, reference being made to the accompanying drawing showing, solely by way of example, and in no way in a limiting manner, one form which the invention can assume. In the drawing:—

Figure 3:
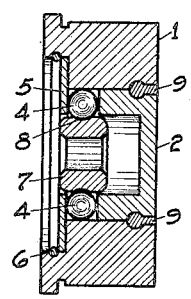
Fig. 3 is a longitudinal sectional view of the embodiment in its completed form.

Referring now to the drawing, and first to Fig. 3, there is here shown a ball race comprising an outer member 1, and an inner member 2, snugly received within the outer member. These two members, when in assembled position, form a shoulder 3, for receiving balls 4 for forming a ball bearing. The balls 4 are held in position by a washer 5, or the like, which is in turn held in position by a spring ring or the like 6, and also by a sleeve 7, which is socketed out, as at 8, to receive the balls 4.

A shaft or the like, which is to be supported in this ball race, (the shaft not being shown since it is deemed unnecessary to so do for the purpose of explaining this invention), is received in the sleeve 7 and is carried thereby, whereby the balls 4 take the lateral thrust, and also any end thrust.

Of more particular interest in the present invention, is the key 9, which is shown in Fig. 3 in its completed form as being annular in form with, in section, an inner enlarged portion, and this key is received in annular matching grooves, 10 and 11 respectively, in the members 1 and 2.

Figure 1:
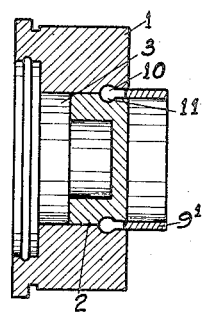
Fig. 1 is a longitudinal sectional view of an embodiment of the invention shown in the course of performance.

This key 9 is formed of aluminum or other suitable material which is relatively soft compared to the material from which the members 1 and 2 are made, and which latter may be any usual material employed for this purpose, such as steel of various grades. The key 9 is formed by a pressing process wherein a section of hollow tubing or the like of aluminum, as shown at $9^1$ of Fig. 1, of a length somewhat greater than the depth of the key slots, and of a diameter equal to that of the annular key slot.

This ring $9^1$ of relatively soft material is placed in the key slot formed by the grooves 10 and 11, and is pressed into the key slot so as to force the material into the enlarged inner end, and completely fill this end and the rest of the slot, with the outer edge of the key approximately flush with the outer faces of the members 1 and 2.

Figure 2:
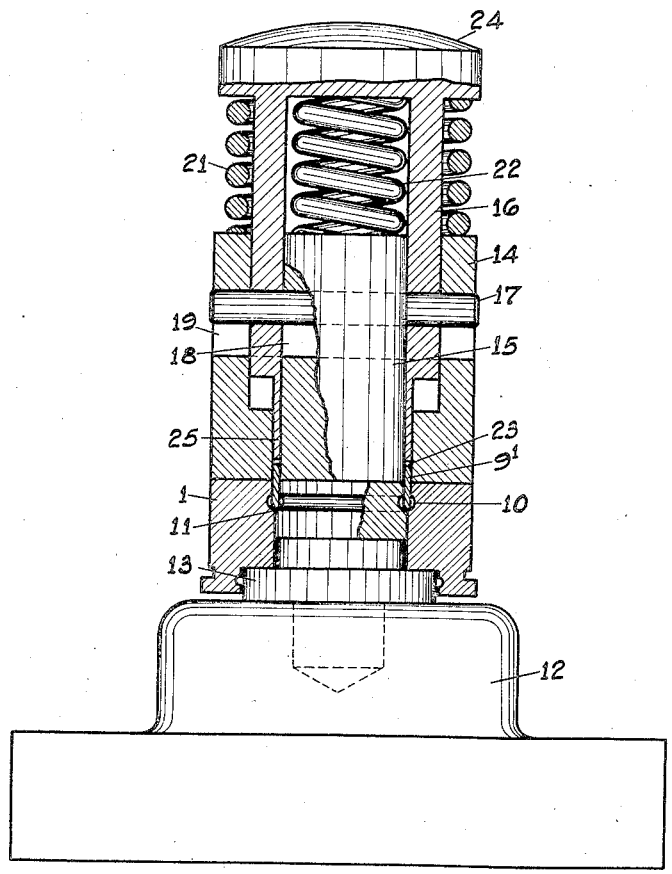
Fig. 2 is a longitudinal sectional view, with parts shown in elevation, with the parts of Fig. 1, in a different stage, and in connection with apparatus for carrying out the process.

An apparatus for performing this pressing operation is shown in Fig. 2, and comprises a base member 12, with a receiving head 13 for receiving the ball race. With the ball race placed on the receiving head of the pressing apparatus, and with the key ring $9^1$ placed in the key slot, a pressing plunger is placed in position thereover, this plunger including an outer member 14, an inner member 15, and a slide 16 intermediate these two members and slidable therein. The slide 16 carries a guide and stop pin 17, operating in slots 18 and 19 formed respectively in the inner and outer members 15 and 14.

An outer spring 22 biases members 16 and 14 apart to thereby position the guide and stop pin 17 at one end of the slot 19, while an inner spring 22 biases the member 16 and the inner member 15 apart to thereby bias the stop pin 17 toward one end of the slot 18 in the inner member.

As can be seen readily from the above description, the pressing member, when not in operation, presents an annular receiving groove 23, in one end thereof, which can receive the projecting portion of the member $9^1$, and thereby accurately position the pressing member on top of the ball race, in the position as shown in Fig. 2. Pressure is then exerted on the head 24 of the slide member 16, to push this slide member inwardly against the tensions of the springs 21 and 22, so as to cause its lower end 25 to force the key ring 9¹ into the key-way and cause the relatively soft metal of which it is constituted to completely fill the key-way and particularly the inner enlarged end thereof whereby to key the two members 1 and 2 tightly together. The pressing movement continues until the key is completely formed. All tendency for the metal of the ring 9¹ to squeeze sideways between the faces of members 1 and 2 and the base of the pressing member is prevented by pressure between these parts holding them firmly together whereby the metal of ring 9¹ is constrained to flow into the receiving key-way.

The above apparatus for forming keys, and the process performed thereby, has provided a simple, relatively cheap, and very satisfactory means and method for forming keys for interconnecting members of various characters.

The above rather specific description of one form of the present invention, has been given solely by way of illustration, and is not intended, in any manner whatsoever, in a limiting sense. Obviously, this invention can assume many different physical forms, and is susceptible of numerous modifications, and all such forms and modifications, are intended to be included by this invention, as come within the scope of the appended claims.

Having described my invention, I now claim:—

1. Apparatus for forming pressed keys, including, a fixed inner member, a fixed outer member, a slidable plunger of annular form received between the two members, and elastic means biasing the plunger relatively to the said fixed members, to leave an annular socket between the inner and outer members for receiving an annular key material member.

2. Apparatus for forming pressed keys, including, a fixed inner member, a fixed outer member, a plunger of annular form received between the two members, two elastic means, one between the outer member and the plunger, and the other between the plunger and the inner member, for biasing the plunger relatively to the said fixed members, to leave an annular socket between the inner and outer members for receiving an annular key material member.

3. Apparatus for forming pressed keys, including, a fixed inner member, a fixed outer member, a slidable plunger of annular form received between the two members, a pin slidably holding the two members and the plunger together as a unit, and elastic means biasing the plunger relatively to the said fixed members, to leave an annular socket between the inner and outer members for receiving an annular key material member.

4. Apparatus for forming pressed keys, including, a fixed inner member, a fixed outer member, a plunger of annular form received between the two members, a pin carried by the plunger and operating to hold the said member and the plunger slidably together as a unit, two elastic means, one between the outer member and the plunger, and the other between the plunger and the inner member, for biasing the plunger relatively to the said fixed members, to leave an annular socket between the inner and outer members for receiving an annular key material member.

JOHN L. OSBORNE.